(12) United States Patent
Oehrlein et al.

(10) Patent No.: US 11,274,219 B2
(45) Date of Patent: Mar. 15, 2022

(54) SURFACE FUNCTIONALIZED TITANIUM DIOXIDE NANOPARTICLES

(71) Applicant: BASF SE, Ludwigshafen am Rhein (DE)

(72) Inventors: Reinhold Oehrlein, Basel (CH); Raphael Dabbous, Kaisten (CH); Michelle Richert, Basel (CH); Gabriele Baisch, Basel (CH)

(73) Assignee: BASF SE (DE)

( * ) Notice: Subject to any disclaimer, the term of this patent is extended or adjusted under 35 U.S.C. 154(b) by 123 days.

(21) Appl. No.: 16/631,617

(22) PCT Filed: Jul. 16, 2018

(86) PCT No.: PCT/EP2018/069269
§ 371 (c)(1),
(2) Date: Jan. 16, 2020

(87) PCT Pub. No.: WO2019/016136
PCT Pub. Date: Jan. 24, 2019

(65) Prior Publication Data
US 2020/0165471 A1    May 28, 2020

(30) Foreign Application Priority Data
Jul. 20, 2017 (EP) .................................... 17182268

(51) Int. Cl.
| | |
|---|---|
| *C09D 7/62* | (2018.01) |
| *C01G 23/053* | (2006.01) |
| *B42D 25/373* | (2014.01) |
| *C09D 7/40* | (2018.01) |
| *B42D 25/378* | (2014.01) |
| *G03H 1/18* | (2006.01) |
| *C09C 1/36* | (2006.01) |
| *B42D 25/328* | (2014.01) |
| *G03H 1/02* | (2006.01) |

(52) U.S. Cl.
CPC ............. *C09D 7/62* (2018.01); *B42D 25/328* (2014.10); *B42D 25/373* (2014.10); *C01G 23/053* (2013.01); *C09C 1/3669* (2013.01); *C09D 7/67* (2018.01); *G03H 1/0244* (2013.01); *G03H 1/0256* (2013.01); *B42D 25/378* (2014.10); *C01P 2004/64* (2013.01); *C01P 2006/60* (2013.01)

(58) Field of Classification Search
CPC .............. C09D 7/62; C09D 7/67; C09D 7/40; B42D 25/328; B42D 25/373; C01G 23/053; C09C 1/3669; C09C 1/36; G03H 1/0244; G03H 1/0256; G03H 1/02; C01P 2004/64; C01P 2006/60
USPC ....... 106/166.81, 204.2, 428, 430, 436, 635, 106/733; 283/67, 70, 72, 74, 75, 86, 94, 283/98
See application file for complete search history.

(56) References Cited

U.S. PATENT DOCUMENTS

| | | | |
|---|---|---|---|
| 4,913,858 A | 4/1990 | Miekka et al. | |
| 5,164,227 A | 11/1992 | Miekka et al. | |
| 5,837,049 A * | 11/1998 | Watson ..................... | C09C 3/08 106/427 |
| 2005/0164876 A1 | 7/2005 | Lee et al. | |
| 2011/0226321 A1 | 9/2011 | Lee et al. | |
| 2012/0276683 A1 | 11/2012 | Mohammadi | |

FOREIGN PATENT DOCUMENTS

| | | |
|---|---|---|
| EP | 0 707 051 A1 | 4/1996 |
| EP | 1 504 923 A2 | 2/2005 |
| GN | 102658103 A | 9/2012 |
| WO | WO 01/03945 A1 | 1/2001 |
| WO | WO 01/53113 A1 | 7/2001 |
| WO | WO 2005/38136 A1 | 4/2005 |
| WO | WO 2005/051675 A2 | 6/2005 |
| WO | WO 2006/094915 A2 | 9/2006 |
| WO | WO 2008/055807 A2 | 5/2008 |
| WO | WO 2008/061930 A1 | 5/2008 |
| WO | WO 2015/049262 A1 | 4/2015 |
| WO | WO 2016/156286 A1 | 10/2016 |
| WO | WO 2016/173696 A1 | 11/2016 |

OTHER PUBLICATIONS

International Preliminary Reporton Patentability received for PCT Patent Application No. PCT/EP2018/069269, dated Jan. 30, 2020, 11 pages.
International Search Report for PCT Patent Application No. PCT/EP2018/069269, dated Oct. 23, 2018, 4 pages.
Extended European Search Report for EP Patent Application No. 17182268.7, dated Jan. 17, 2018, 4 pages.
Cozzoli, et al., "Low-Temperature Synthesis of Soluble and Processable Organic-Capped Anatase $TIO_2$ Nanorods", Journal of the American Chemical Society, vol. 125, Issue 47, Oct. 31, 2003, pp. 14539-14548.
Geldof, et al., "Binding modes of phosphonic acid derivatives adsorbed on $TiO_2$ surfaces: Assignments of experimental IR and NMR spectra based on DFT/PBC calculations", Surface Science, vol. 655, Jan. 2017, pp. 31-38.
Himmelhuber, et al., "Titanium oxide sol-gel films with tunable refractive index", Optical Materials Express, vol. 1, Issue 2, 2011, pp. 252-258.

(Continued)

*Primary Examiner* — Justin V Lewis
(74) *Attorney, Agent, or Firm* — Faegre Drinker Biddle & Reath LLP

(57) ABSTRACT

The present invention relates to surface functionalized titanium dioxide nanoparticles, a method for its production, a coating composition, comprising the surface functionalized titanium dioxide nanoparticles and the use of the coating composition for coating holo-grams, wave guides and solar panels. Holograms are bright and visible from any angle, when printed with the coating composition, comprising the surface functionalized tita-nium dioxide nanoparticles.

17 Claims, No Drawings

(56) References Cited

OTHER PUBLICATIONS

Luschtinetz, et al., "Adsorption of Phosphonic Acid at the $TiO_2$ Anatase (101) and Rutile (110) Surfaces", The Journal of Physical Chemistry C, vol. 113, Issue 14, Mar. 18, 2009, pp. 5730-5740.
Rajalakshmi, et al., "Synthesis of dialkyl 2-(Methacryloyloxyethyl) phosphonates, their characterization and polymerization", Polymer Science Series B, vol. 57, 2015, pp. 408-416.
Ruiterkamp, et al., "Surface functionalization of titanium dioxide nanoparticles with alkanephosphonic acids for transparent nanocomposites", Journal of Nanoparticle Research, vol. 13, 2011, pp. 2779-2790.
Walter Caseri, "Inorganic nanoparticles as optically effective additives for polymers", Chemical Engineering Communications, vol. 196, Issue 5, 2009, pp. 549-572.
Wang, et al., "New high-refractive-index organic/inorganic hybrid materials from sol-gel processing", Macromolecules, vol. 24, Issue 11, May 1, 1991, pp. 3449-3450.
U.S. Appl. No. 16/324,751, filed Feb. 11, 2019, Reinhold Oehrlein et al.
U.S. Appl. No. 16/613,714, filed Nov. 14, 2019, Nikolay A Grigorenko.

\* cited by examiner

SURFACE FUNCTIONALIZED TITANIUM DIOXIDE NANOPARTICLES

The present invention relates to surface functionalized titanium dioxide nanoparticles, a method for its production, a coating composition, comprising the surface functionalized titanium dioxide nanoparticles and the use of the coating composition for coating holograms, wave guides and solar panels. Holograms are bright and visible from any angle, when printed with the coating composition, comprising the surface functionalized titanium dioxide nanoparticles.

EP0707051 relates to treated inorganic solid comprising particulate titanium dioxide or zinc oxide, the particles of which are coated with a composition consisting essentially of an organophosphorus compound selected from the group consisting of alkylphosphonic acids and esters of alkylphosphonic acids wherein the alkylphosphonic acid contains from 8 to 22 carbon atoms. The titanium dioxide particles have an average primary particle size in the range of 10 to 150 nm.

H. Weller et al. J. Amer. Chem. Soc. 125 (2003) 14539 describe the synthesis of high aspect ration anastase $TiO_2$ nanorods by hydrolysis of titanium tetraisopropoxide in oleic acid at a temperature as low as 80° C. Typically the $TiO_2$ nanorods have uniform lengths up to 40 nm and a diameter of 3 to 4 nm.

B. Wang et al., Macromolecules 24 (1991) 3449 describe the preparation of high refractive index organic/inorganic hybrid materials from sol-gel processing.

R. Himmelhuber et al., Optical Materials Express 1 (2011) 252 describe titanium oxide sol gel films with tunable refractive index.

US2012276683 describes the preparation of titania pastes. Hydrochloric acid as a catalyst and distilled water as a dispersing medium are mixed at room temperature of about 20° C. to 25° C. at a molar ratio of hydrochloric acid to distilled water of 0.5:351.3. Next, one mole of titanium tetraisopropoxide as a titanium precursor is added to the solution under continuous stirring, forming a thick, white precipitate. Finally, the sol is peptized for about two hours to form a clear titania sol. The titania nanoparticles exhibit a narrow size distribution ranging from about 10 nm to about 27 nm with an average particle size of 19 nm. During experimentation, it was found that the titania sol was stable for at least seven months.

US2005164876 relates to the preparation of photocatalysts. 10 g of titanium isopropoxide (TTIP, Acros) was slowly added at room temperature to a solution of absolute ethanol (EtOH) in a breaker under vigorously stirred for 0.5 h to prevent a local concentration of the TTIP solution. EtOH mixed with nitric acid was added to the solution to promote hydrolysis. Polyethylene glycol (PEG, Acros) 600 was added to the solution and stirred for 1 h. The solution was then ultra sounded for 0.5 h and left for 24 h before being used. The molar ratio of TTIP:EtOH:PEG was 1:15:10, corresponding to 5 weight percent of $TiO_2$ in order to compare the photodegradation using P25. Photocatalyst T1 was immobilized on glass fiber by dip-coating. The glass fiber was loaded into the solution for 30 min and retracted at a rate of 10 mm/s. The glass fiber was dried at 100° C. for 2 h and then calcinated at 450° C. for 2 h at a heating rate of 5.5° C./min in air. The average crystallite size of T1 deposited on glass fiber was 9.8 nm.

WO2006094915 relates to metal oxide nanoparticles coated with phosphonates of formula (I)

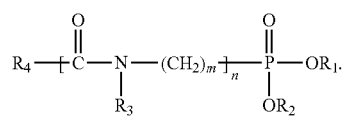

The process of production of the metal oxide nanoparticles coated with phosphonates of formula (I) involves mixing the metal oxides with the phosphonates of formula (I) in an organic solvent at elevated temperature. In Example 17 of WO2006094915 titanium dioxide P25 (Ø ca. 21 nm, available from DEGUSSA) was coated with the phosphonate compounds.

US2011226321 relates to titanium dioxide nano particles capped with a surface stabilizer represented by any one of Chemical Formulae 1 to 3:

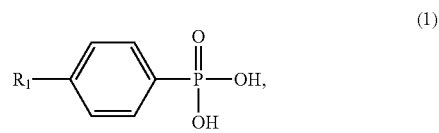

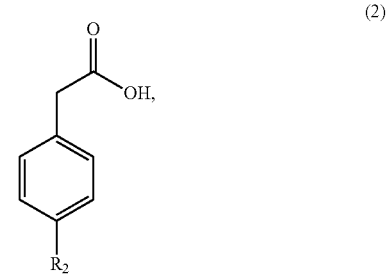

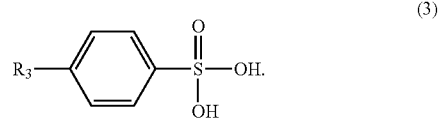

The method for preparing the titanium dioxide nano particles comprises: mixing and reacting titanium isopropoxide with a surface stabilizer represented by any one of Chemical Formulae 1 to 3 in a solvent; and evaporating the solvent from thus produced titanium dioxide colloid.

G. J. Ruitencamp et al. J. Nanopart. Res. 2011, 13, 2779 reports the surface functionalization of rutile titanium dioxide with 1-decylphosponic acid and diethyl undec-10-enyl phosphonate in a two-stage process. The dual-functionalized particles possessed a uniform size of around 13 nm. Transparent nanocomposites were formed by introducing the functionalized nanoparticles into a poly(benzyl acrylate) matrix. A polymer containing 14.0 vol. % $TiO_2$ had a refractive index of 1.63 at $\lambda=586$ nm.

For many optical applications, high refractive index materials are highly desirable. However, those materials consist of metal oxides e.g. $ZrO_2$ (RI (Refractive Index) ca. 2.13) or $TiO_2$ (RI ca. 2.59) which are not easy to process in printing lacquers and are incompatible with merely organic carrier materials or organic overcoats. A number of methods for compatibilizing e.g. $TiO_2$-surfaces have been described (D. Geldof et al. Surface Science, 2017, 655, 31). However, carboxylate ligands or siloxane ligands—which always give high amounts of unwanted homocondensation by-products—although easily prepared are not stable toward hydrolysis. Highly stable surface coatings may be achieved with phosphonate ligands (WO 2006/094915). The Ti—O—P bonding is highly stable and forms the required colorless coats (R. Luschtinetz et al. J. Phys. Chem. C 2009, 113, 5730). The adsorption and chemical stable bonding also takes place rapidly. The stability of phosphonate ligands is based on the specific binding mode of the phosphonate (phosphate) moiety on $TiO_2$-surfaces. Potentially, three oxygen atoms can attach to the metal surface resulting in enhanced surface binding.

In addition, besides being cheap and non-toxic $TiO_2$ nanoparticles can be prepared in various core sizes. The preferred particle size however, should be <40 nm, in order to avoid the Rayleigh's scattering in the visible spectrum range (W. Casari et al. Chem. Eng. Commun. 2009, 196, 549) and thus forming a transparent material.

There is however a problem associated with $TiO_2$ nanoparticles prepared by the sol-gel method. These particles—as known from any nano-particle preparation—tend to agglomerate and subsequently precipitate from aqueous or organic solutions, so appropriate treating (protection) of the $TiO_2$-nano-particles is a necessity for storage and applications in printing lacquers. However, when coated with organic material the refractive index of the $TiO_2$ nanocrystals gets 'diluted' as the molar fraction is reduced according the equation:

$$\theta_{v,TiO_2} = \frac{\frac{(1-L)\cdot\theta_{w,p}}{\rho_{TiO_2}}}{\frac{(1-\theta_{w,p})}{\rho_m} + \frac{(1-L)\cdot\theta_{w,p}}{\rho_{TiO_2}} + \frac{L\cdot\theta_{w,p}}{\rho_f}}$$

wherein $\Theta_{vTiO2}$ is the volume fraction of $TiO_2$-material, $\Theta_{w,p}$ is weight fraction functionalized particle in nano-composite, L weight fraction (loss) of volatiles e.g. alcohols or water, $\rho_{TiO2}$ density of $TiO_2$, $\rho_m$ density of coating matrix, $\rho_f$ density of functionalization layer on particles (G. J. Ruitencamp et al. J. Nanopart. Res. 2011, 13, 2779). So, keeping up a high refractive index and achieving the desired stability of the hybrid particles necessitates a well-balanced ratio of inorganic and organic surface treatment. According the equation the low refractive organics should be kept at such a minimum, only rendering the particles soluble and processable and not 'diluting' the refractive index of the particles too much.

This can be achieved following the inventive description given below.

One aspect of the present invention relates to the preparation of transparent, redissolvable storage stable $TiO_2$ nanoparticles via a so-called sol-gel process resulting in high refractive index material.

The process for preparing titanium dioxide nanoparticles comprises
(a) adding a solution of concentrated hydrogen chloride (33% in water) diluting this solution with half volume of distilled water (60-29.8/volume-volume) diluting this solution with additional ethanol (90-1910/volume-volume) (resulting in solution I) to a solution of titanium-tetra-isopropoxide first stirred in (absolute) ethanol (10-90/weight-volume) resulting in a solution II, both volumes I and II being equal,
(b) stirring the obtained clear solution for 5 days at room temperature, and (c) evaporating the clear solution at 20-30° C./20 mm until a constant weight is achieved to obtain titanium dioxide nanoparticles.

The titanium dioxide nanoparticles obtainable by the above process have a particle size from 1 nm to 40 nm, preferably from 1 nm to 10 nm, more preferably from 1 nm to 5 nm. They are storable at 4° C. for at least 3 months and can be redissolved in methanol, ethanol, propanol, 2-methoxy ethanol, iso-propanol, 2-iso-propoxy ethanol, butanol, N-methyl pyrrolidone, dimethyl formamide, ethyl acetate, propyl acetate, butyl acetate and dimethyl acetamide. A film of the titanium dioxide nanoparticles which is dried at 25° C. shows a refractive index of greater than 1.70 (589 nm), especially of greater than 1.75, very especially of greater than 1.80. The refractive index may be even 1.95, when the film of the titanium dioxide nanoparticles is dried at 120° C.

The $TiO_2$-content of the titanium dioxide nanoparticles is at least 40% (w) (% by weight), preferably at least 45% (w) and most preferably at least 50% (w) confirmed by differential scanning colorimetry (DSC).

In another aspect, the present invention relates to the surface functionalization of the $TiO_2$ nanoparticles by both phosphonates and alkoxides. Preferably, either the alkoxides or preferably the phosphonates bear a polymerizable moiety, preferably an olefinic double bond polymerizable via photo initiation and/or radical initiation. The coating of the $TiO_2$ nanoparticles by phosphonates and alkoxides can be performed subsequently or stepwise in either order or simultaneously.

The process for the production of the surface functionalized titanium dioxide nanoparticles comprises the following steps:
a) dissolving the titanium dioxide nanoparticles in a solvent, such as, for example, ethanol, or isopropanol,
b) adding the phosphonate of formula (I) and optionally the alcohol of formula

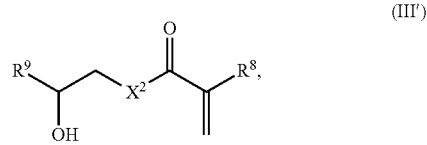

(III')

and
(c) stirring the mixture obtained in step (b) until a transparent solution is obtained, and
(d) evaporating the mixture until the weight remains constant.

The titanium dioxide nanoparticles employed in the process for the production of the surface functionalized titanium dioxide nanoparticles are preferably the titanium dioxide nanoparticles obtained according to the process of the present invention.

Accordingly, the present invention relates to surface functionalized titanium dioxide nanoparticles coated with
a) a phosphonate of formula

(I)

or a mixture of phosphonates of formula (I), wherein
$R^1$ and $R^2$ are independently of each other hydrogen, or a $C_1$-$C_4$alkyl group,
$R^3$ is a group $CH_2$=$CH$—, or a group of formula —$[CH_2]_n$—$R^4$, wherein n is an integer of 1 to 12, when n>3 one —$CH_2$— may be replaced by —S— with the proviso that S is not directly linked to P, or $R^4$,
$R^4$ is hydrogen, or a group of formula

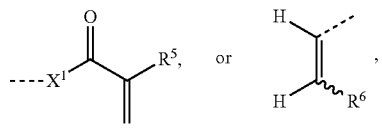

$R^5$ is hydrogen, or a $C_1$-$C_4$alkyl group,
$R^6$ is hydrogen, or a $C_1$-$C_4$alkyl group,
$X^1$ is O, or NH, and
b) bonded with an alkoxide of formula $R^7O^-$ (II) and/or

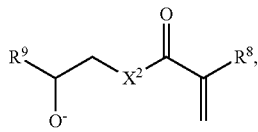
(III)

wherein
$R^7$ is a $C_1$-$C_8$alkyl group, which may be interrupted one or more times by —O— and/or substituted one or more times by —OH,
$R^8$ is hydrogen, or a $C_1$-$C_4$alkyl group,
$R^9$ is hydrogen, —$CH_2OH$, —$CH_2SPh$, —$CH_2OPh$, or a group of formula $R^{10}$—$[CH_2OH$—O—$CH_2]_{n1}$—,
n1 is an integer of 1 to 5,
$X^2$ is O, or NH,
$R^{10}$ is a group of formula —$CH_2$—$X^3$—$CH_2$—$C$(=O)—$CR^{11}$=$CH_2$,
$X^3$ is O, or NH, and
$R^{11}$ hydrogen, or a $C_1$-$C_4$alkyl group.

The surface functionalized titanium dioxide nanoparticles have a size from 1 nm to 40 nm, preferably from 1 nm to 10 nm, more preferably from 1 nm to 5 nm.

The surface functionalized titanium dioxide nanoparticles exhibit a refractive index of greater than 1.70 (589 nm), especially of greater than 1.75, very especially of greater than 1.80, when coated on a glass plate and dried at 60° C.

The surface functionalized titanium dioxide nanoparticles are dissolved in ethanol, or iso-propanol and spin-coated on float-glass substrates. The coated glass substrates are dried at temperatures of from 60 to 120° C. until weight constancy and the Refractive Index (RI) of the coatings (layer thickness ca. 400 nm) is determined by white-light reflectometry using a Filmetrics F10-RTA-UV photospectrometer with an internal fitting algorithm (Cauchy fit). From the fitting the refractive indices were calculated for a wavelength of 589 nm.

The weight ratio of titanium dioxide nanoparticles to phosphonate(s) of formula (I) and alkoxide(s) of formula (II) and (III) is in the range of from 99-1 to 50-50, preferably 80-20 to 50-50, more preferably 70-30 to 50-50 and most preferably from 65-35 to 50-50.

The weight ratio of phosphonate(s) of formula (I) and alkoxide(s) of formula (II) and (III) is in the range of from 1-99 to 50-50, preferably 10-90 to 50-50, more preferably 5-95 to 50-50, and most preferably 3-97 to 50-50.

The phosphonate is preferably a phosphonate of formula (I), wherein
$R^1$ and $R^2$ are hydrogen,
$R^3$ is a group $CH_2$=$CH$—, or a group of formula —$[CH_2]_n$—$R^4$, wherein
n is an integer of 1 to 4,
$R^4$ is hydrogen, or a group of formula

 (A-1)

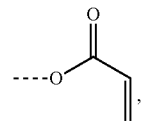 (A-2)

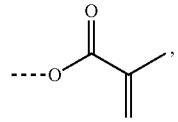 (A-3)

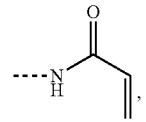 (A-4)

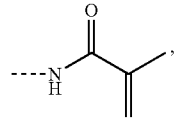 (A-5)

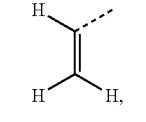 (A-6)

, or (A-7)

( ----- bond to $[CH_2]_n$).

Among the groups of formula (A-1) to (A-7) groups of formula (A-1) and (A-2) are preferred.

In one embodiment of the present invention phosphonates of formula

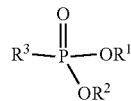

(I) are more preferred, wherein
$R^1$ and $R^2$ are hydrogen,
$R^3$ is a group of formula —$[CH_2]_n$—$R^4$, wherein
n is an integer of 1 to 12,
$R^4$ is hydrogen. This embodiment has the advantage of low refractive index dilution and rapid coating.

In another embodiment of the present invention phosphonates of formula

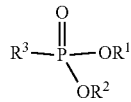
(I)

are more preferred, wherein
$R^1$ and $R^2$ are hydrogen,
$R^3$ is a group of formula —$[CH_2]_n$—$R^4$, wherein
n is an integer of 1 to 12,
when n>3 one —$CH_2$— may be replaced by —S— with the proviso that S is not directly linked to P, or $R^4$,
$R^4$ is a group of formula

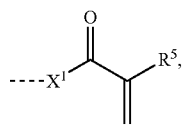

$R^5$ is hydrogen, or a methyl group and $X^1$ is O, or NH, especially O. This embodiment offers the advantage of more stable attachment of olefinic groups to $TiO_2$ surface.

Examples of the phosphonate of formula (I) are
i) a compound of formula

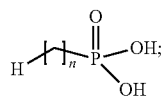
(B1)

n is 1 to 8), such as, for example,

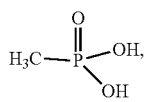
(B1a)

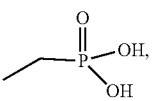
(B1b)

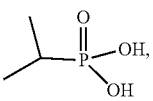
(B1c)

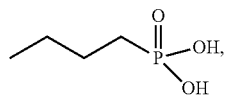
(B1d)

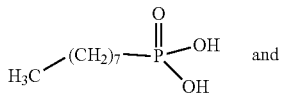
(B1e)
and

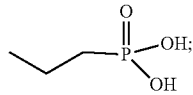
(B1f)

ii) a compound of formula

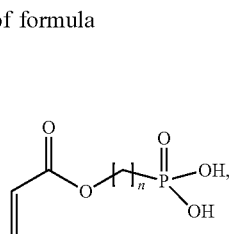
(B2)

n is 1 to 5), such as, for example,

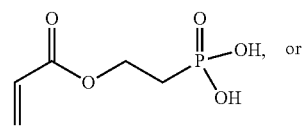
(B2a)
or

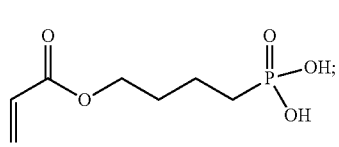
(B2b)

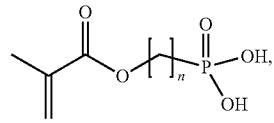
(B2')

n is 1 to 5), such as, for example,

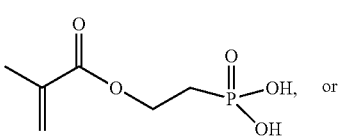
(B2' a)
or

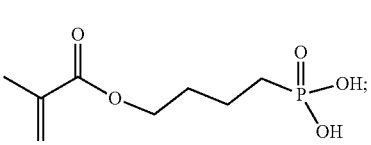
(B2' b)

iii) a compound of formula

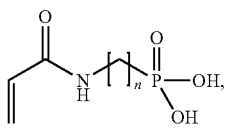
(B3)

n is 1 to 5), such as, for example,

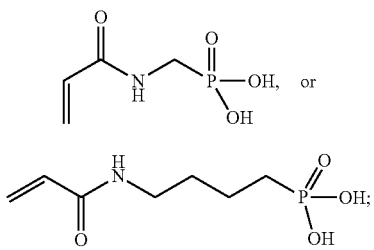
(B3a)

(B3b)

iv) a compound of formula

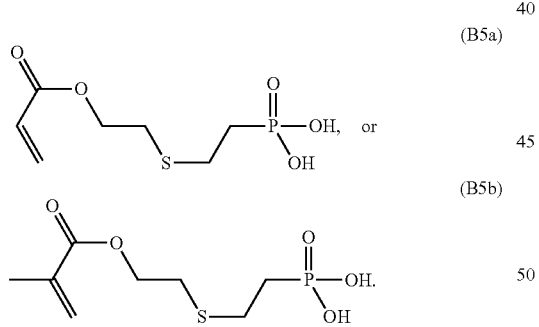

(B4)

n is 1 to 5), such as, for example, (B4a)

(B4b)

v) For n is 3 to 5 in compounds B2, B2', B3 and B4 one —CH$_2$— may be replaced by sulfur resulting, for example, in a compound of formula (B5a)

(B5b)

Compounds of formula (B3) are less preferred than compounds of formula (B2).

In the alkoxide of formula $R^7O^-$ (II) $R^7$ is a $C_1$-$C_8$alkyl group, which may be interrupted one or more times by —O— and/or substituted one or more times by —OH. Examples of the alkoxide of formula (II) are $CH_3O^-$ (D-1), $CH_3CH_2O^-$ (D-2), $CH_3CH_2CH_2O^-$ (D-3), $(CH_3)_2CHO^-$ (D-4), $CH_3CH_2CH_2CH_2O^-$ (D-5), $(CH_3)_2CHCH_2O^-$ (D-6), $(CH_3)_2CHOCH_2CH_2O^-$ (D-7), $(CH_3)_2CHOCHCH_2OH)(CH_2CH_2O^-)$ (D-8), $(CH_3)_2CHOCH_2CH(OH)(CH_2O^-)$ (D-9). Preferred alkoxides of formula (II) are $CH_3CH_2O^-$ (D-2) and $(CH_3)_2CHO^-$ (D-4), because organic solvents used in the printing industries comprise preferably volatile primary and/or secondary alcohols.

The alkoxide of formula (III) is preferably derived from the following alcohols:

(C-1)

(C-2)

(C-3)

(C-4)

(C-5)

(C-6)

(C-7)

(C-8)

(C-9)

(C-10)

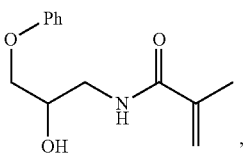 (C-11),

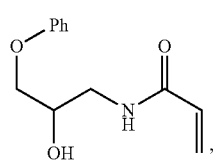 (C-12),

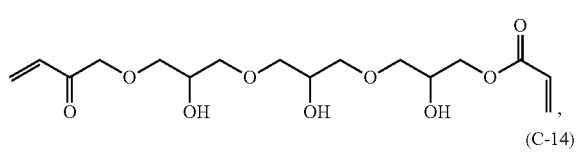 (C-13),

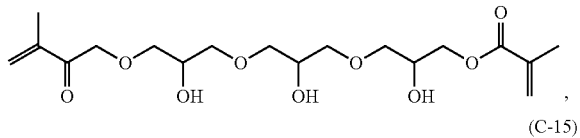 (C-14),

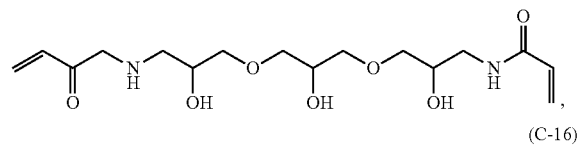 (C-15),

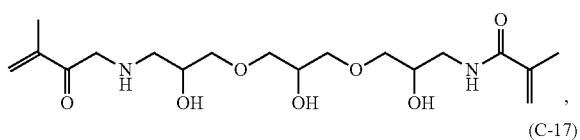 (C-16),

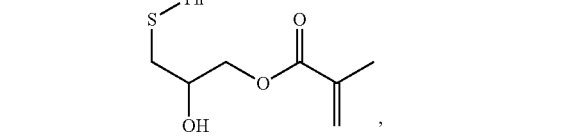 (C-17),

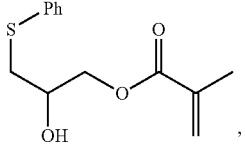 (C-18),

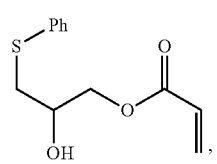 (C-19),

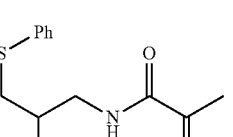 or (C-20)

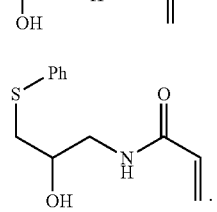.

Among the alcohols of formula (C-1) to (C-20) alcohols of formula (C-9), (C-10), (C-13) and (C-14) are preferred.

A single phosphonate or a mixture of up to three different phosphonates, preferably two phosphonates with weight ratios of 1-99 to 99-1 may be used, according the specific application parameters. Usually at least two different alkoxides are present.

Examples of surface functionalized $TiO_2$ particles are shown in the table below:

| Example ($TiO_2$ nanop.) | Phosphonate (I) | Alkoxide (II)/(III) | Refractive Index (RI) |
|---|---|---|---|
| (T-1) | (B1a) | (D-2), (D-4) | RI of 1.82 when dried at 120° C. |
| (T-2) | (B1a) | (D-2), (D-4), (C-10') | RI of 1.82 when dried at 120° C. |
| (T-3) | (B1a), (B3b) | (D-2), (D-4) | RI of 1.81 when dried at 80° C. |
| (T-4) | (B1a), (B2'a) | (D-2), (D-4) | RI of 1.76 when dried at 80° C. |
| (T-5) | (B1a), (B5b) | (D-2), (D-4) | RI of 1.76 when dried at 60° C. |
| (T-6) | (B1e), (B5b) | (D-2), (D-4) | RI of 1.75 when dried at 60° C. |
| (T-7) | (B2'a) | (D-2), (D-4), (C-10') | RI of 1.75 when dried at 60° C. |

At present the surface functionalized $TiO_2$ particles (T-1), (T-4) and (T-7) are most preferred.

The surface functionalized $TiO_2$ nanoparticles having high refractive index and stability are soluble in organic solvents or aqueous mixtures of organic solvents used in the printing industries; those solvents preferably comprise volatile primary or secondary alcohols e.g. as ethanol, isopropanol and the like as known in the art.

Accordingly, the present invention is directed to a coating composition, comprising the surface functionalized titanium dioxide nanoparticles of the present invention and a solvent.

The solvent is preferably selected from water, alcohols (such as methanol, ethanol, 1-propanol, 2-propanol, 1-butanol, 2-butanol, isobutanol, tert-butanol, tert-pentanol), cyclic or acyclic ethers (such as diethyl ether, tetrahydrofuran and 2-methyltetrahydrofurane), ketones (such as acetone, 2-butanone, 3-pentanone), ether-alcohols (such as 2-methoxyethanol, 1-methoxy-2-propanol, ethylene glycol monobutyl ether, diethylene glycol monoethyl ether, diethylene glycol monopropyl ether, and diethylene glycol monobutyl ether), esters (such as ethyl acetate, ethyl propionate, and ethyl 3-ethoxypropionate) and mixtures thereof.

Volatile primary or secondary alcohols, like ethanol and/so-propanol are most preferred.

The amount of solvent in the (coating or printing ink) composition is dependent on the coating process, printing process etc. For gravure printing the solvent may be present in the printing ink composition in an amount of from 80 to 97% by weight of the printing ink composition, preferably 90 to 95% by weight.

The compositions, preferably printing ink compositions may comprise a binder. Generally, the binder is a high-molecular-weight organic compound conventionally used in coating compositions. High molecular weight organic materials usually have molecular weights of about from $10^3$ to $10^8$ g/mol or even more. They may be, for example, natural resins, drying oils, rubber or casein, or natural substances derived therefrom, such as chlorinated rubber, oil-modified alkyd resins, viscose, cellulose ethers or esters, such as ethylcellulose, cellulose acetate, cellulose propionate, cellulose acetobutyrate or nitrocellulose, but especially totally synthetic organic polymers (thermosetting plastics and thermoplastics), as are obtained by polymerisation, polycondensation or polyaddition. From the class of the polymerisation resins there may be mentioned, especially, polyolefins, such as polyethylene, polypropylene or polyisobutylene, and also substituted polyolefins, such as polymerisation products of vinyl chloride, vinyl acetate, styrene, acrylonitrile, acrylic acid esters, methacrylic acid esters or butadiene, and also copolymerisation products of the said monomers, such as especially ABS or EVA.

With respect to the binder resin, a thermoplastic resin may be used, examples of which include, polyethylene based polymers [polyethylene (PE), ethylene-vinyl acetate copolymer (EVA), vinyl chloride-vinyl acetate copolymer, vinyl alcohol-vinyl acetate copolymer, polypropylene (PP), vinyl based polymers [poly(vinyl chloride) (PVC), poly(vinyl butyral) (PVB), poly(vinyl alcohol) (PVA), poly(vinylidene chloride) (PVdC), poly(vinyl acetate) (PVAc), poly(vinyl formal) (PVF)], polystyrene based polymers [polystyrene (PS), styreneacrylonitrile copolymer (AS), acrylonitrile-butadiene-styrene copolymer (ABS)], acrylic based polymers [poly(methyl methacrylate) (PMMA), MMA-styrene copolymer], polycarbonate (PC), celluloses [ethyl cellulose (EC), cellulose acetate (CA), propyl cellulose (CP), cellulose acetate butyrate (CAB), cellulose nitrate (CN), also known as nitrocellulose], fluorin based polymers [polychlorofluoroethylene (PCTFE), polytetrafluoroethylene (PTFE), tetrafluoroethylene-hexafluoroethylene copolymer (FEP), poly(vinylidene fluoride) (PVdF)], urethane based polymers (PU), nylons [type 6, type 66, type 610, type 11], polyesters (alkyl) [polyethylene terephthalate (PET), polybutylene terephthalate (PBT), polycyclohexane terephthalate (PCT)], novolac type phenolic resins, or the like. In addition, thermosetting resins such as resol type phenolic resin, a urea resin, a melamine resin, a polyurethane resin, an epoxy resin, an unsaturated polyester and the like, and natural resins such as protein, gum, shellac, copal, starch and rosin may also be used.

The binder preferably comprises nitrocellulose, ethyl cellulose, cellulose acetate, cellulose acetate propionate (CAP), cellulose acetate butyrate (CAB), hydroxyethyl cellulose (HEC), hydroxypropyl cellulose (HPC), alcohol soluble propionate (ASP), vinyl chloride, vinyl acetate copolymers, vinyl acetate, vinyl, acrylic, polyurethane, polyamide, rosin ester, hydrocarbon, aldehyde, ketone, urethane, polythylene-terephthalate, terpene phenol, polyolefin, silicone, cellulose, polyamide, polyester, rosin ester resins, shellac and mixtures thereof, most preferred are soluble cellulose derivatives such as hydroxylethyl cellulose, hydroxypropyl cellulose, nitrocellulose, carboxymethylcellulose as well as chitosan and agarose, in particular hydroxyethyl cellulose and hydroxypropyl cellulose.

The (coating or printing ink) compositions may also comprise an additional colorant. Examples for suitable dyes and pigments are given subsequently.

The (printing ink or coating) composition may also contain a surfactant. In general surfactants change the surface tension of the composition. Typical surfactants are known to the skilled person, they are for example, anionic or non-ionic surfactants. Examples of anionic surfactants can be, for example, a sulfate, sulfonate or carboxylate surfactant or a mixture thereof. Preference is given to alkylbenzenesulfonates, alkyl sulfates, alkyl ether sulfates, olefin sulfonates, fatty acid salts, alkyl and alkenyl ether carboxylates or to an α-sulfonic fatty acid salt or an ester thereof.

Preferred sulfonates are, for example, alkylbenzenesulfonates having from 10 to 20 carbon atoms in the alkyl radical, alkyl sulfates having from 8 to 18 carbon atoms in the alkyl radical, alkyl ether sulfates having from 8 to 18 carbon atoms in the alkyl radical, and fatty acid salts derived from palm oil or tallow and having from 8 to 18 carbon atoms in the alkyl moiety. The average molar number of ethylene oxide units added to the alkyl ether sulfates is from 1 to 20, preferably from 1 to 10. The cation in the anionic surfactants is preferably an alkaline metal cation, especially sodium or potassium, more especially sodium. Preferred carboxylates are alkali metal sarcosinates of formula $R_9$—$CON(R_{10})CH_2COOM_1$ wherein $R_9$ is $C_9$-$C_{17}$alkyl or $C_9$-$C_{17}$alkenyl, $R_{10}$ is $C_1$-$C_4$alkyl and $M_1$ is an alkali metal such as lithium, sodium, potassium, especially sodium.

$C_9$-$C_{17}$alkyl means n-, i-nonyl, n-, i-decyl, n-, i-undecyl, n-, i-dodecyl, n-, i-tridecyl, n-, i-tetradecyl, n-, i-pentadecyl, n-, i-hexadecyl, n-, i-heptadecyl.

$C_9$-$C_{17}$alkenyl means n-, i-nonenyl, n-, i-decenyl, n-, i-undecenyl, n-, i-dodecenyl, n-, i-tridecenyl, n-, i-tetradecenyl, n-, i-pentadecenyl, n-, i-hexadecenyl, n-, i-heptadecenyl.

The non-ionic surfactants may be, for example, a primary or secondary alcohol ethoxylate, especially a $C_8$-$C_{20}$ aliphatic alcohol ethoxylated with an average of from 1 to 20 mol of ethylene oxide per alcohol group. Preference is given to primary and secondary $C_{10}$-$C_{15}$ aliphatic alcohols ethoxylated with an average of from 1 to 10 mol of ethylene oxide per alcohol group. Non-ethoxylated non-ionic surfactants, for example alkylpolyglycosides, glycerol monoethers and polyhydroxyamides (glucamide), may likewise be used. Further in addition, an auxiliary agent including a variety of reactive agents for improving drying property, viscosity, and dispersibility, may suitably be added. The auxiliary agents are to adjust the performance of the ink, and for example, a compound that improves the abrasion resistance of the ink surface and a drying agent that accelerates the drying of the ink and the like may be employed.

Furthermore, a plasticizer for stabilizing the flexibility and strength of the print film may be added according to the needs therefor.

The (coating or printing ink) composition may further contain a dispersant. The dispersant may be any polymer which prevents agglomeration or aggregation of the spherical and shaped particles formed after heating step D). The dispersant may be a non-ionic, anionic or cationic polymer having a weight average molecular weight of from 500 to 2,000,000 g/mol, preferably from 1,500,000 to 1,000,000 g/mol, which forms a solution or emulsion in the aqueous mixture. Typically, the polymers may contain polar groups. Suitable polymeric dispersants often possess a two-component structure comprising a polymeric chain and an anchoring group. The particular combination of these leads to their effectiveness.

Suitable commercially available polymeric dispersants are, for example, EFKA® 4046, 4047, 4060, 4300, 4330, 4580, 4585, 8512, Disperbyk® 161, 162, 163, 164, 165, 166, 168, 169, 170, 2000, 2001, 2050, 2090, 2091, 2095, 2096, 2105, 2150, Ajinomoto Fine Techno's PB® 711, 821, 822, 823, 824, 827, Lubrizol's Solsperse® 24000, 31845, 32500, 32550, 32600, 33500, 34750, 36000, 36600, 37500, 39000, 41090, 44000, 53095, ALBRITECT® CP30 (a copolymer of acrylic acid and acrylphosphonate) and combinations thereof.

Preference is given to polymers derived from hydroxyalkyl(meth)acrylates and/or polyglycol (meth)acrylates, such as hydroxyethyl and hydroxypropyl (meth)acrylate, polyethylene glycol (meth)acrylates, (meth)acrylates having amine functionality, for example, N-[3-(dimethylamino)propyl](meth)acrylamide or 2-(N,N-dimethylamino)ethyl (meth)acrylate.

In particular, non-ionic copolymer dispersants having amine functionality are preferred. Such dispersants are commercially available, for example as EFKA® 4300, EFKA® 4580 or EFKA 4585. The polymeric dispersants may be used alone or in admixture of two or more.

The coating composition of the present invention may be used for coating holograms, wave guides and solar panels.

The coating or printing ink composition of the present invention can be used in the manufacture of surface relief microstructures, such as, for example, an optically variable devices (OVD), such as, for example, a hologram).

The method for forming a surface relief microstructure on a substrate comprising the steps of:
a) forming a surface relief microstructure on a discrete portion of the substrate; and
b) depositing the coating composition according to the present invention on at least a portion of the surface relief microstructure.

A further specific embodiment of the invention concerns a preferred method for forming a surface relief microstructure on a substrate, wherein step a) comprises
a1) applying a curable compound to at least a portion of the substrate;
a2) contacting at least a portion of the curable compound with surface relief microstructure forming means; and
a3) curing the curable compound.

The composition of the present invention may be applied to the substrate by means of conventional printing press such as gravure, flexographic, lithographic, offset, letterpress intaglio and/or screen process, or other printing process.

In another embodiment the composition may be applied by coating techniques, such as spraying, dipping, casting or spin-coating.

Preferably the printing process is carried out by flexographic, offset or by gravure printing.

The resulting coatings, comprising the surface functionalized $TiO_2$ nanoparticles, are transparent in the visible region. The transparent surface functionalized $TiO_2$ nanoparticles containing layer has a thickness from 50 nm to 500 nm after drying. The surface functionalized $TiO_2$ nanoparticles containing coating is dried at below 120° C. to avoid damage of organic substrates and/coating layers.

In another aspect the invention relates to the use of the surface functionalized $TiO_2$ nanoparticles in UV-curable printable curing inks preferably processed via gravure printing resulting in flexible hybrid layers.

The resulting products may be coated with a protective coating. The protective coating is preferably transparent or translucent. Examples for such coatings are known to the skilled person. For example, water borne coatings, UV-cured coatings or laminated coatings may be used. Examples for typical coating resins will be given below.

The surface functionalized $TiO_2$ nanoparticles may be coated onto organic foils via gravure printing followed by a transparent overcoat subsequently being UV-cured (e.g. Irgacure 819®, Irgacure 184® and Lumogen OVD Primer 301®). That way ligands, i.e. phosphonates (I) and/or alkoxides (II)/(III), carrying olefinic moieties are arrested in the coating impeding subsequent migration and aggregation of the particles which would result in severe loss of transparency.

The (security, or decorative) product obtainable by using the above method forms a further subject of the present invention.

Accordingly, the present invention is directed to a security, or decorative element, comprising a substrate, which may contain indicia or other visible features in or on its surface, and on at least part of the said substrate surface, a coating according to the present invention.

Typically the security product includes banknotes, credit cards, identification documents like passports, identification cards, driver licenses, or other verification documents, pharmaceutical apparel, software, compact discs, tobacco packaging and other products or packaging prone to counterfeiting or forgery.

The substrate may comprise any sheet material. The substrate may be opaque, substantially transparent or translucent, wherein the method described in WO08/061930 is especially suited for substrates, which are opaque to UV light (non-transparent). The substrate may comprise paper, leather, fabric such as silk, cotton, tyvac, filmic material or metal, such as aluminium. The substrate may be in the form of one or more sheets or a web.

The substrate may be mould made, woven, non-woven, cast, calendared, blown, extruded and/or biaxially extruded. The substrate may comprise paper, fabric, man made fibres and polymeric compounds. The substrate may comprise any one or more selected from the group comprising paper, papers made from wood pulp or cotton or synthetic wood free fibres and board. The paper/board may be coated, calendared or machine glazed; coated, uncoated, mould made with cotton or denim content, Tyvac, linen, cotton, silk, leather, polythyleneterephthalate, polypropylene propafilm, polyvinylchloride, rigid PVC, cellulose, tri-acetate, acetate polystyrene, polyethylene, nylon, acrylic and polytherimide board. The polythyleneterephthalate substrate may be Melinex type film orientated polypropylene (obtainable from DuPont Films Wilmington Del. product ID Melinex HS-2).

The substrates being transparent films or non-transparent substrates like opaque plastic, paper including but not limited to banknote, voucher, passport, and any other security or fiduciary documents, self adhesive stamp and excise seals, card, tobacco, pharmaceutical, computer software packaging and certificates of authentication, aluminium, and the like.

In a preferred embodiment of the present invention the substrate is a non-transparent (opaque) sheet material, such as, for example, paper. Advantageously, the paper may be precoated with an UV curable lacquer. Suitable UV curable lacquers and coating methods are described, for example, WO2015/049262 and WO2016/156286.

In another preferred embodiment of the present invention the substrate is a transparent or translucent sheet material, such as, for example, polyethylene terephthalate, polyethylene naphthalate, polyvinyl butyral, polyvinyl chloride, flexible polyvinyl chloride, polymethyl methacrylate, poly(ethylene-co-vinyl acetate), polycarbonate, cellulose triacetate, polyether sulfone, polyester, polyamide, polyolefins, such as, for example, polypropylene, and acrylic resins. Among these, polyethylene terephthalate and polypropylene are preferred. The flexible substrate is preferably biaxially oriented.

The forming of an optically variable image on the substrate may comprise depositing a curable composition on at least a portion of the substrate, as described above. The curable composition, generally a coating or lacquer may be deposited by means of gravure, flexographic, inkjet and screen process printing. The curable lacquer may be cured by actinic radiations, preferably ultraviolet (UV) light or electron beam. Preferably, the curable lacquer is UV cured. UV curing lacquers are well known and can be obtained from e.g. BASF SE. The lacquers exposed to actinic radiations or electron beam used in the present invention are required to reach a solidified stage when they separate again from the imaging shim in order to keep the record in their upper layer of the sub-microscopic, holographic diffraction grating image or pattern (optically variable image, OVI). Particularly suitable for the lacquer compositions are mixtures of typical well-known components (such as photoinitiators, monomers, oligomers. levelling agents etc.) used in the radiation curable industrial coatings and graphic arts. Particularly suitable are compositions containing one or several photo-latent catalysts that will initiate polymerization of the exposed lacquer layer to actinic radiations. Particularly suitable for fast curing and conversion to a solid state are compositions comprising one or several monomers and oligomers sensitive to free-radical polymerization, such as acrylates, methacrylates or monomers or/and oligomers, containing at least one ethylenically unsaturated group, examples have already been given above. Further reference is made to pages 8 to 35 of WO2008/061930.

The UV lacquer may comprise an epoxy-acrylate from the CRAYNOR® Sartomer Europe range (10 to 60%) and one or several acrylates (monofunctional and multifunctional), monomers which are available from Sartomer Europe (20 to 90%) and one, or several photoinitiators (1 to 15%) such as Darocure® 1173 and a levelling agent such as BYK®361 (0.01 to 1%) from BYK Chemie.

The epoxy-acrylate is selected from aromatic glycidyl ethers aliphatic glycidyl ethers. Aromatic glycidyl ethers are, for example, bisphenol A diglycidyl ether, bisphenol F diglycidyl ether, bisphenol B diglycidyl ether, bisphenol S diglycidyl ether, hydroquinone diglycidyl ether, alkylation products of phenol/dicyclopentadiene, e.g., 2,5-bis[(2,3-epoxypropoxy)phenyl]octahydro-4,7-methano-5H-indene (CAS No. [13446-85-0]), tris[4-(2,3-epoxypropoxy)phenyl] methane isomers (CAS No. [66072-39-7]), phenol-based epoxy novolaks (CAS No. [9003-35-4]), and cresol-based epoxy novolaks (CAS No. [37382-79-9]). Examples of aliphatic glycidyl ethers include 1,4-butanediol diglycidyl ether, 1,6-hexanediol diglycidyl ether, trimethylolpropane triglycidyl ether, pentaerythritol tetraglycidyl ether, 1,1,2,2-tetrakis[4-(2,3-epoxypropoxy)phenyl]ethane (CAS No. [27043-37-4]), diglycidyl ether of polypropylene glycol ($\alpha,\omega$-bis(2,3-epoxypropoxy)poly(oxypropylene), CAS No. [16096-30-3]) and of hydrogenated bisphenol A (2,2-bis[4-(2,3-epoxypropoxy)cyclohexyl]propane, CAS No. [13410-58-7]).

The one or several acrylates are preferably multifunctional monomers which are selected from trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, tripropylene glycol diacrylate (TPGDA), dipropylene glycol diacrylate (DPGDA), pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tripentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacrylates of polyethylene glycol with a molecular weight of from 200 to 1500, triacrylate of singly to vigintuply alkoxylated, more preferably singly to vigintuply ethoxylated trimethylolpropane, singly to vigintuply propoxylated glycerol or singly to vigintuply ethoxylated and/or propoxylated pentaerythritol, such as, for example, ethoxylated trimethylol propane triacrylate (TMEOPTA) and or mixtures thereof.

The photoinitiator is preferably a blend of an alpha-hydroxy ketone, alpha-alkoxyketone or alpha-aminoketone compound and a benzophenone compound; or a blend of an alpha-hydroxy ketone, alpha-alkoxyketone or alpha-aminoketone compound, a benzophenone compound and an acylphosphine oxide compound.

The curable composition is preferably deposited by means of gravure or flexographic printing.

The curable composition can be coloured.

A filmic substrate is printed conventionally with a number of coloured inks, using, for example, a Cerutti R950 printer (available from Cerrutti UK Long Hanborough Oxon.). The substrate is then printed with an ultra violet curable lacquer. An OVD is cast into the surface of the curable composition with a shim having the OVD thereon, the holographic image is imparted into the lacquer and instantly cured via a UV lamp, becoming a facsimile of the OVD disposed on the shim.

The diffraction grating may be formed using any methods known to the skilled man such as those described in U.S. Pat. Nos. 4,913,858, 5,164,227, WO2005/051675 and WO2008/061930.

The curable coating composition may be applied to the substrate by means of conventional printing press such as gravure, rotogravure, flexographic, lithographic, offset, letterpress intaglio and/or screen process, or other printing process.

Preferably, when the substrate carrying the enhanced diffractive image or pattern is subsequently over-laid onto printed pictures and/or text, or the substrate is pre-printed with pictures and/or text and the enhanced diffractive image or pattern is deposited thereon, those printed features are visible through the substrate, provided that the substrate itself is at least opaque, translucent or transparent. Preferably the $TiO_2$ layer which is printed over the OVD, for example the diffraction grating is also sufficiently thin as to allow viewing in transmission and reflectance. In other words the whole security element on the substrate allows a viewing in transmission and reflectance.

In another preferred embodiment the security element comprises a mutlilayer structure capable of interference, wherein the multilayer structure capable of interference has a reflection layer, a dielectric layer, and a partially transparent layer (EP1504923, WO01/03945, WO01/53113, WO05/38136, WO16173696), wherein the dielectric layer is arranged between the reflection layer and the partially transparent layer and the absorber layer is formed by a layer, containing the surface functionalized $TiO_2$ nanoparticles of the present invention.

Suitable materials for the reflective layer include aluminum, silver, copper mixtures or alloys thereof. Suitable materials for the dielectric layer include silicium dioxide, zinc sulfide, zinc oxide, zirconium oxide, zirconium dioxide, titanium dioxide, diamond-like carbon, indium oxide, indium-tin-oxide, tantalum pentoxide, cerium oxide, yttrium oxide, europium oxide, iron oxides, hafnium nitride, hafnium carbide, hafnium oxide, lanthanum oxide, magnesium oxide, magnesium fluoride, neodymium oxide, praseodymium oxide, samarium oxide, antimony trioxide, silicon monoxide, selenium trioxide, tin oxide, tungsten trioxide and combinations thereof as well as organic polymer acrylates.

The absorber layer is preferably an aluminum or silver layer and the dielectric layer is preferably formed of $SiO_2$.

The curable composition may further comprise modifying additives, for example colorants and/or suitable solvent(s).

Preferably, the resin maintains adhesion of the composition to the surface of the diffraction grating.

Specific additives can be added to the composition to modify its chemicals and/or physical properties. Polychromatic effects can be achieved by the introduction of (colored) inorganic and/or organic pigments and/or solvent soluble dyestuffs into the ink, to achieve a range of coloured shades. By addition of a dye the transmission colour can be influenced. By the addition of fluorescent or phosphorescent materials the transmission and/or the reflection colour can be influenced.

Suitable colored pigments especially include organic pigments selected from the group consisting of azo, azomethine, methine, anthraquinone, phthalocyanine, perinone, perylene, diketopyrrolopyrrole, thioindigo, dioxazine iminoisoindoline, dioxazine, iminoisoindolinone, quinacridone, flavanthrone, indanthrone, anthrapyrimidine and quinophthalone pigments, or a mixture or solid solution thereof; especially a dioxazine, diketopyrrolopyrrole, quinacridone, phthalocyanine, indanthrone or iminoisoindolinone pigment, or a mixture or solid solution thereof.

Colored organic pigments of particular interest include C.I. Pigment Red 202, C.I. Pigment Red 122, C.I. Pigment Red 179, C.I. Pigment Red 170, C.I. Pigment Red 144, C.I. Pigment Red 177, C.I. Pigment Red 254, C.I. Pigment Red 255, C.I. Pigment Red 264, C.I. Pigment Brown 23, C.I. Pigment Yellow 109, C.I. Pigment Yellow 110, C.I. Pigment Yellow 147, C.I. Pigment Orange 61, C.I. Pigment Orange 71, C.I. Pigment Orange 73, C.I. Pigment Orange 48, C.I. Pigment Orange 49, C.I. Pigment Blue 15, C.I. Pigment Blue 60, C.I. Pigment Violet 23, C.I. Pigment Violet 37, C.I. Pigment Violet 19, C.I. Pigment Green 7, C.I. Pigment Green 36, the 2,9-dichloro-quinacridone in platelet form described in WO08/055807, or a mixture or solid solution thereof.

Plateletlike organic pigments, such as plateletlike quinacridones, phthalocyanine, fluororubine, dioxazines, red perylenes or diketopyrrolopyrroles can advantageously be used.

Suitable colored pigments also include conventional inorganic pigments; especially those selected from the group consisting of metal oxides, antimony yellow, lead chromate, lead chromate sulfate, lead molybdate, ultramarine blue, cobalt blue, manganese blue, chrome oxide green, hydrated chrome oxide green, cobalt green and metal sulfides, such as cerium or cadmium sulfide, cadmium sulfoselenides, zinc ferrite, bismuth vanadate, Prussian blue, $Fe_3O_4$, carbon black and mixed metal oxides.

Examples of dyes, which can be used to color the curable composition, are selected from the group consisting of azo, azomethine, methine, anthraquinone, phthalocyanine, dioxazine, flavanthrone, indanthrone, anthrapyrimidine and metal complex dyes. Monoazo dyes, cobalt complex dyes, chrome complex dyes, anthraquinone dyes and copper phthalocyanine dyes are preferred.

The surface relief microstructure is, for example, an optically variable device (OVD), which is, for example, a diffractive optical variable image (DOVI). The term "diffractive optical variable image" as used herein may refer to any type of holograms including, for example, but not limited to a multiple plane hologram (e.g., 2-dimensional hologram, 3-dimensional hologram, etc.), a stereogram, and a grating image (e.g., dot-matrix, pixelgram, exelgram, kinegram, etc.).

Examples of an optically variable device are holograms or diffraction gratings, moire grating, lenses etc. These optical microstructured devices (or images) are composed of a series of structured surfaces. These surfaces may have straight or curved profiles, with constant or random spacing, and may even vary from microns to millimetres in dimension. Patterns may be circular, linear, or have no uniform pattern. For example a Fresnel lens has a microstructured surface on one side and a pano surface on the other. The microstructured surface consists of a series of grooves with changing slope angles as the distance from the optical axis increases. The draft facets located between the slope facets usually do not affect the optical performance of the Fresnel lens.

A further aspect of the present invention is the use of the element as described above for the prevention of counterfeit or reproduction, on a document of value, right, identity, a security label or a branded good.

Various aspects and features of the present invention will be further discussed in terms of the examples. The following examples are intended to illustrate various aspects and features of the present invention.

The refractive indices of the HRI coatings (layer thickness ca. 400 nm) on float-glass substrates are determined by white-light reflectometry using a Filmetrics F10-RTA-UV photospectrometer with an internal fitting algorithm (Cauchy fit). From the fitting the refractive indices were calculated for a wavelength of 589 nm.

The size of the functionalized titanium dioxide nanoparticles is measured using a Transmission Electron Microscope (TEM).

EXAMPLES

Example 1

Preparation of Phosphonates:

Phosphonate acrylamide and acrylate precursors have been synthesized according WO2006/094915 unless otherwise stated or are used as commercially available. All $^1$H-NMR taken at 300.13 MHz and $^{31}$P-NMR at 121.5 MHz.

Example 1.1

Methyl Phosphonate of Formula

(I)

($R^4$, $R^1$ and $R^2$=H; n=1):

50.0 g commercial dimethyl methyl phosphonic ester (Aldrich) are dissolved in 400 ml acetonitrile at room temperature and treated with 135.7 g trimethylsilyl bromide at 40° C. for 20 h. Then the mixture is evaporated and the residue treated with an excess of methanol to hydrolyze the silyl ester for 48 h at room temperature. Evaporation leaves 38.0 g of the methyl phosphonic acid (B1a) ready for further use.

$^1$H-NMR (DOCD$_3$): 1.42 ppm (d). $^{31}$P-NMR (DOCD$_3$): +28.4 ppm.

Example 1.2

Butyl Phosphonate of Formula (I) (R$^4$, R$^1$ and R$^2$=H; n=4):

According the procedure given for example 1.1, 35.0 g of butyl phosphonate (B1d) is obtained from 50.0 g of diethylbutyl phosphonic ester ready for further use.

$^1$H-NMR (CDCl$_3$): 0.94 ppm (t, 3H); 1.48 ppm (m, 2H); 1.61 ppm (m, 2H); 1.76 ppm (m, 2H). $^{31}$P-NMR (CDCl$_3$): +36.6 ppm.

Example 1.3

Octyl Phosphonate of Formula (I) (R$^4$, R$^1$ and R$^2$=H; n=8):

According the procedure given for example 1.1, 11.0 g of octyl phosphonate (B1e) is obtained from 15.0 g of diethyloctyl phosphonic ester ready for further use.

$^1$H-NMR (CDCl$_3$): 0.90 ppm (t, 3H); 1.28-1.41 ppm (m, 8H); 1.57-1.82 (m, 6H). $^{31}$P-NMR (CDCl$_3$): +36.0 ppm.

Example 1.4

4-acryloylamido-butyl Phosphonate of Formula (I) (R$^4$=acryloylamido-, R$^1$ and R$^2$=H, n=4)

112.0 g of Diethyl-4-amino butyl phosphonic ester (WO2006/094915) are reacted with 75.0 g of 2-chloro acetic acid chloride (Aldrich) in 600 ml dichloromethane in the presence of 59.7 g triethyl amine at 0° C. to room temperature for 24 h. The mixture is then subsequently extracted with 1N hydrogen chloride solution, water and brine and dried over sodium sulfate, filtered and evaporated to leave 111.1 g of a syrupy mass which is used in the next step. The product is dissolved in 450 ml of acetone containing 62.0 g of DBU (diaza-bicycloundecane) and 20 mg methoxy phenol and stirred at room temperature for 24 h. Subsequent evaporation leaves a residue which is extracted with 1 N hydrogen chloride, sat. sodium hydrogencarbonate solution and brine to give after removal of solvent 67.2 g of the phosphonic ester. The ester is treated according the procedure given in example 1 with 85.5 g trimethyl silylbromide in 475 ml acetonitrile to give 47.3 g of the title compound (B3b).

$^1$H-NMR (DOCD$_3$): 1.44-1.80 ppm (m, 6H); 3.30 ppm (t, 2H); 5.67 ppm (dd, 1H); 6.24 ppm (dd, 2H). $^{31}$P-NMR (DOCD$_3$): +30.4 ppm.

Example 1.5

4-vinyl butyl Phosphonate of Formula (I) (R$^4$=vinyl-, R$^1$ and R$^2$=H, n=4)

4.8 g of the starting diethyl phosphonate (R$^4$=vinyl, R$^1$=R$^2$=Et, n=4) obtained according (WO2006/094915) are treated according the procedure in example 1.1 with 6.7 g trimethylsilyl bromide in acetonitrile to give 3.0 g of the title compound (B4b).

$^1$H-NMR (CDCl$_3$): 1.55 ppm (m, 2H); 1.68 ppm (m, 2H); 1.81 ppm (m, 2H); 2.12 ppm (m, 2H); 5.00 ppm (m, 2H); 5.81 ppm (m, 1H). $^{31}$P-NMR (CDCl$_3$): +30.2 ppm

Example 1.6

2-methacroyloxy-butyl Phosphonate of Formula (I) (R$^4$=methacroyloxy-, R$^1$ and R$^2$=H, n=2)

The starting dimethyl 2-methacroyloxy derivative (R$^4$=methacroyloxy, R$^1$=R$^2$=Me, n=2) is obtained according literature (K. Rajalakshmi et al. Polym. Sci. Ser. B, 2015, 57(5), 408). 28.0 g of this material is then treated with 41.0 g of trimethyl siliyl bromide in 120 ml acetonitrile according the procedure given in example 1.1 to give 24 g of the title compound (B2a) ready for further use.

$^1$H-NMR (CDCl$_3$): 2.01 ppm (s, 3H); 2.22 ppm (m, 2H); 4.38 ppm (m, 2H); 5.58 ppm (s, 1H), 6.12 ppm (s, 1H). $^{31}$P-NMR (CDCl$_3$): +28.3 ppm.

Example 1.7

5-methacryolyloxy-3 thia pentyl Phosphonate of Formula (I) (R$^4$=5-methacryolyloxy-3 thia pentyl-, R$^1$ and R$^2$=H, n=5)

32.8 g of commercial diethyl vinylphosphonic ester are reacted with 15.6 g of 2-mercapto ethanol and 0.5 mg of sodium ethanolate (in 1.5 ml abs. ethanol) for 32 h at 107° C. After cooling down to room temperature the mixture is dissolved in dichloromethane and washed with water and dried over sodium sulfate. Filtration and evaporation leaves a residue which is purified by silica gel column chromatography (eluent: dichloromethane-methanol: 40-1) to give 38.2 g of the intermediate alcohol (R$^4$=5 hydroxy-3-thia pentyl, R=Et, n=5).

34.9 g of this material is dissolved in 300 ml dichloromethane containing 22.6 g triethyl amine and 4-methoxy phenol as stabilizer and cooled to −10° C. Then 27 g of methacrylic acid chloride are added and the mixture stirred for 20 h. Subsequent extraction with 1 N hydrogen chloride, sat. hydrogen carbonate solution and brine and evaporation leaves a residue which is purified over silica gel column chromatography (eluent: dichloromethane-methanol: 40-1) to give 38.7 g of the title compound (B5a).

$^1$H-NMR (CDCl$_3$): 1.97 ppm (s, 3H; 2.16 ppm (m, 2H); 2.87 ppm (m, 4H); 4.35 ppm (t, 2H); 5.63 ppm (s, 1H); 6.16 ppm (s, 1H). $^{31}$P-NMR (CDCl$_3$): +28.5 ppm.

Example 2

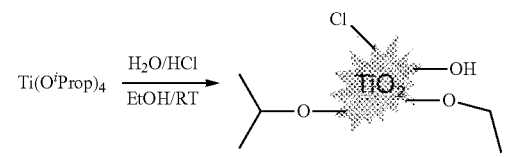

(idealized with one potential ligand each only)
Preparation of Transparent, Soluble and Storable TiO$_2$-Nanoparticles (Idealized with One Potential Ligand Each Only):

A 5 l flask is first charged with 200 g (0.70 mol) commercial titanium-tetra-iso-propoxide (Aldrich) and filled up to a total volume of 2 l with dry absolute ethanol (Merck). This mixture is stirred smoothly (200 rpm) at room temperature. To this solution is subsequently funneled a second solution having been prepared from 60 ml of 33% hydrogen chloride (Aldrich) and 29.8 ml of distilled water filled up to a total volume of 2 l with ethanol. The resulting clear solution is stirred for 5 days at room temperature and then smoothly evaporated at 20°-30° C./20 mm until a constant weight is achieved.

A transparent foamy material (118.9 g) is obtained which can be crushed to a solid when dry. This material can be stored at least over three months at 4° C. without any visible change and can be redissolved clearly in e.g. methanol, ethanol, propanol, 2-methoxy ethanol, iso-propanol, 2-iso-propoxy ethanol, butanol, N-methyl pyrrolidone, dimethyl formamide, dimethyl acetamide and the like. A TGA (thermogravimetric analysis) of this material up to 450° C. shows a weight loss of about 42%, which leaves a total $TiO_2$ contents of at least 58%. A TEM (transmission electron microscopy) shows particle sizes <5 nm. A film of this material dried at 25° C. shows a refractive index (RI) (589 nm) of 1.72 and when dried at 120° C. an RI of 1.95, accordingly.

The titanium dioxide nanoparticles are dissolved in ethanol, or isopropanol and spin-coated on float-glass substrates. The coated glass substrates are dried at temperatures of 25, or 120° C. until weight constancy and the Refractive Index (RI) of the coatings (layer thickness ca. 400 nm) is determined by white-light reflectometry using a Filmetrics F10-RTA-UV photospectrometer with an internal fitting algorithm (Cauchy fit). From the fitting the refractive indices were calculated for a wavelength of 589 nm.

Example 3

Coating of Soluble & Storable $TiO_2$-Nanoparticles:

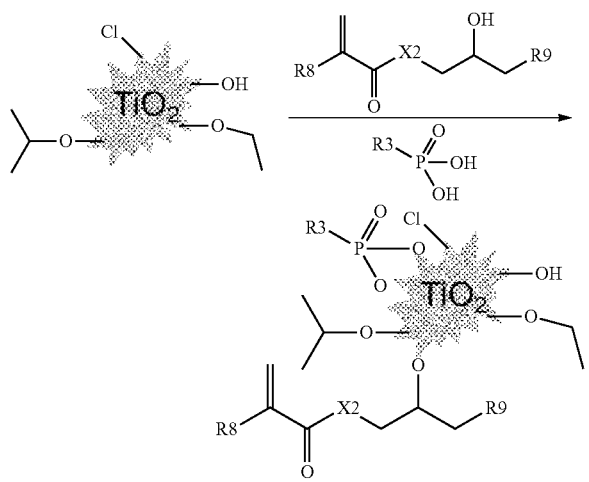

Example 3.1

Coating of $TiO_2$-Nanoparticles of Example 2 with Phosphonate of Formula (I) of Example 1.1 ($R^4$, $R^1$ and $R^2$=H; n=1):

1.00 g of dried $TiO_2$-nanoparticles are dissolved at room temperature in 10 ml of ethanol together with various amounts from 0.01 g to 0.75 g (1% to 75%) of phosphonate of example 1.1 dissolved in 2 ml ethanol and stirred 18 h-24 h. All solutions are clear after being stirred for 1 h. The 1% sample stays clear as a 7% w/v solution in ethanol or as a 20% w/v in 2 iso-propoxy ethanol (R'—OH).

The 1% sample e.g. gives a film after drying at 40° C. with thickness ca. 875 nm and RI=1.8240.

Example 3.2

Coating of $TiO_2$-Nanoparticles of Example 2 with Phosphonate of Formula (I) of Example 1.1 ($R^4$, $R^1$ and $R^2$=H; n=1) and

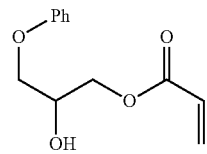

(C-10)

10.00 g of dried $TiO_2$-nanoparticles are dissolved at room temperature in 4.20 ml of ethanol to form a transparent solution; to this mixture a solution of 0.108 g of phosphonate of example 1.1, dissolved in 0.30 ml ethanol is added at room temperature and stirred for 3.5 h. Thereafter 0.96 g of compound (C-10), dissolved in 0.50 ml ethanol is added and the transparent mixture stirred for 24 h and subsequently evaporated until the weight remains constant to give a yellowish syrupy mass.

Example 3.3

Coating of $TiO_2$-Nanoparticles of Example 2 with Phosphonate of Formula (I) of Example 1.1 ($R^4$, $R^1$ and $R^2$=H; n=1) and Phosphonate of Formula (I) of Example 1.4 ($R^4$=acryloylamido-, $R^1$ and $R^2$=H, n=4):

10.00 g of dried $TiO_2$-nanoparticles are dissolved at room temperature in 50 ml of ethanol together with 0.20 g of phosphonate of example 1.1 to form a transparent solution and stirred for 2.5 h; to this mixture a solution of 0.800 g of phosphonate of example 1.4, dissolved in 20 ml ethanol is added at room temperature and stirred for an additional 18.5 h. Thereafter the transparent mixture evaporated until the weight remains constant to give a yellowish syrupy mass. This material shows an RI of 1.70 when dried at room temperature and an RI of 1.81 when dried at 80° C.

Example 3.4

Coating of $TiO_2$-Nanoparticles of Example 2 with Phosphonate of Formula (I) of Example 1.1 ($R^4$, $R^1$ and $R^2$=H; n=1) and Phosphonate of Formula (I) of Example 1.6 ($R^4$=methacryloxy, $R^1$ and $R^2$=H, n=2):
Coating of $TiO_2$-Nanoparticles of Example 2 with Phosphonate of Example 1.1 Methyl Phosphonate of Example 1.1 and Phosphonic Acid I ($R^4$=methacryloxy, R=H, n=2):

160.00 g of dried $TiO_2$-nanoparticles are dissolved at room temperature in 60 ml of ethanol, to this mixture are added 3.20 g of phosphonate of example 1.6 dissolved in 5 ml ethanol and stirred for 3 h to form a transparent solution; to this mixture a solution of 12.60 g of phosphonate of example 1.1, dissolved in 5 ml ethanol is added at room temperature and stirred for an additional 18.5 h. Fines are filtered off and the transparent mixture is evaporated until the weight remains constant to give a yellowish syrupy mass. This material shows an RI of 1.76 when dried at 80° C.

Example 3.5

Coating of $TiO_2$-Nanoparticles of Example 2 with Phosphonate of Formula (I) of Example 1.1 ($R^4$, $R^1$ and $R^2$=H; n=1)

and Phosphonate of Formula (I) of Example 1.7 ($R^4$=5-methacryolyloxy-3 thia pentyl-, $R^1$ and $R^2$=H, n=5):

1.00 g of dried $TiO_2$-nanoparticles are dissolved at room temperature in 3.00 ml of ethanol, to this mixture are added 0.275 g of phosphonate of example 1.7 dissolved in 2 ml ethanol and stirred for 7 h to form a transparent solution; to this mixture a solution of 0.02 g of phosphonate of example 1.1, dissolved in 2 ml ethanol is added at room temperature and stirred for an additional 18.5 h. The transparent mixture is evaporated until the weight remains constant to give a yellowish syrupy mass.

Example 3.6

Coating of $TiO_2$-Nanoparticles of Example 2 with Phosphonate of Formula (I) of Example 1.3 ($R^4$, $R^1$ and $R^2$=H; n=8) and Phosphonate of Formula (I) of Example 1.7 ($R^4$=5-methacryolyloxy-3 thia pentyl-, $R^1$ and $R^2$=H, n=5):

2.00 g of dried $TiO_2$-nanoparticles are dissolved at room temperature in 20.00 ml of ethanol, to this mixture are added 0.100 g of phosphonate of example 1.3 and 0.50 g phosphonate of example 1.7 dissolved in 4 ml ethanol and stirred for 24 h to form a transparent solution. The transparent mixture is evaporated until the weight remains constant to give a white foamy mass which forms transparent solutions in ethanol.

Example 3.7

Coating of $TiO_2$-Nanoparticles of Example 2 with Phosphonate of Formula (I) of Example 1.6 ($R^4$=Vinyl-, $R^1$ and $R^2$=H, n=4) and Alcohol (C-10):

10.00 g of dried $TiO_2$-nanoparticles are dissolved at room temperature in 4.20 ml of ethanol, to this mixture are added 0.300 g of phosphonic acid of example 1.6 dissolved in 0.30 ml ethanol and stirred for 3 h; thereafter 0.96 g of alcohol (C-10) dissolved in 0.50 ml ethanol are added and stirred for an additional 24 h. The transparent mixture is evaporated until the weight remains constant to give a yellowish syrupy mass which forms transparent solutions in ethanol.

Example 4

Measuring of RI and Film Thickness of Titanium Nanoparticles Containing Films

The titanium nanoparticles are diluted at a ratio 1:10 in ethanol. The solution is mixed at room temperature with a magnetic stirrer at low regime (roughly 50 rpm). Glass plates are cleaned with ethanol and wiped without leaving any fibers or contamination. Then the glass plates are Corona-treated twice (power 300 W). The glass plates are fixed on a spin coater by vacuum. The solution is visually transparent. After mixing, the solution, an amount of 0.1, resp. 0.2 g is taken with a pipette and applied on the center of the glass plate. The spin coater is turned on and runs at a rotational speed of 150 rpm during 10 seconds then immediately 10000 rpm during 4 seconds. A visual examination ensures that the coatings are transparent.

The coated glass plates are dried at temperatures of from 60 to 120° C. until weight constancy and the Refractive Index (RI) of the coatings (layer thickness ca. 400 nm) are determined by white-light reflectometry using a Filmetrics F10-RTA-UV photospectrometer with an internal fitting algorithm (Cauchy fit). From the fitting the refractive indices were calculated for a wavelength of 589 nm.

The results are summarized in the table below:

| Example ($TiO_2$ nanop.) | Phosphonate (I) | Alkoxide (II)/(III) | Refractive Index (RI) |
|---|---|---|---|
| 3.1 (T-1) | $H_3C-P(=O)(OH)-OH$ (B1a) | $EtO^-$ (D-2), $iPropO^-$ (D-4) | RI of 1.82 when dried at 120° C. |
| 3.2 (T-2) | $H_3C-P(=O)(OH)-OH$ (B1a) | $EtO^-$ (D-2), $iPropO^-$ (D-4), (C-10') | RI of 1.82 when dried at 120° C. |
| 3.3 (T-3) | $H_3C-P(=O)(OH)-OH$, (B1a) | $EtO^-$ (D-2), $iPropO^-$ (D-4) | RI of 1.81 when dried at 80° C. |

-continued

| Example (TiO₂ nanop.) | Phosphonate (I) | Alkoxide (II)/(III) | Refractive Index (RI) |
|---|---|---|---|
| | acrylamido-butyl phosphonic acid (B3b) | | |
| 3.4 (T-4) | methylphosphonic acid (B1a); 2-(methacryloyloxy)ethyl phosphonic acid (B2′a) | EtO⁻ (D-2), iPropO⁻ (D-4) | RI of 1.76 when dried at 80° C. |
| 3.5 (T-5) | methylphosphonic acid (B1a); 2-((methacryloyloxy)ethylthio)ethyl phosphonic acid (B5b) | EtO⁻ (D-2), iPropO⁻ (D-4) | RI of 1.76 when dried at 60° C. |
| 3.6 (T-6) | octylphosphonic acid (B1e); 2-((methacryloyloxy)ethylthio)ethyl phosphonic acid (B5b) | EtO⁻ (D-2), iPropO⁻ (D-4)⁻ | RI of 1.75 when dried at 60° C. |
| 3.7 (T-7) | 2-(methacryloyloxy)ethyl phosphonic acid (B2′a) | EtO⁻ (D-2), iPropO⁻ (D-4), phenoxy-hydroxy-propyl acrylate anion (C-10′) | RI of 1.75 when dried at 60° C. |

Example 5

Gravure Printing

The titanium nanoparticles containing products of examples 3.1 to 3.7 (40% to 70% (w (weight)/v (volume)) solids in ethanol) are diluted to a final 6.5% (w/v) concentration (of solids:surface-treated $TiO_2$ particles) with ethanol. The resulting ink is printed by gravure on PET foil containing holograms and no holograms using a 70 l/cm gravure cylinder at printing speed 10-90 m/min, heating 90° C.

| Surface functionalized $TiO_2$ particle | OVD image visibility after printing | OVD image visibility after overlacquering with UV varnish |
|---|---|---|
| T-7 (6.3% solids in ethanol) | Excellent, clear film | Good, clear film |
| T-4 (5.8% solids in ethanol) | Excellent, clear film | Good, clear film |

The resulting foil is highly transparent and color less. Holograms are bright and visible from any angle, after overcoating the printed foil with 10 micron UV varnish, holographic structures remain visible.

The invention claimed is:

1. Surface functionalized titanium dioxide nanoparticles treated with a) a phosphonate of formula:

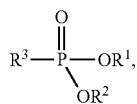

(I)

or a mixture of phosphonates of formula (I), wherein:

$R^1$ and $R^2$ are independently of each other hydrogen, or a $C_1$-$C_4$alkyl group, $R^3$ is a group $CH_2$=CH—, or a group of formula —[$CH_2$]$_n$—$R^4$, wherein n is an integer of 1 to 12, when n>3 one —$CH_2$— may be replaced by —S— with a proviso that S is not directly linked to P, or $R^4$, $R^4$ is hydrogen, or a group of formula

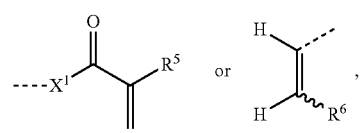

$R^5$ is hydrogen, or a $C_1$-$C_4$alkyl group,
$R^6$ is hydrogen, or a $C_1$-$C_4$alkyl group,
$X^1$ is O, or NH, and b) bonded with an alkoxide of formula $R^7O^-$ (II) and/or

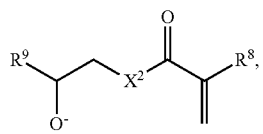

(III)

wherein:

$R^7$ is a $C_1$-$C_8$alkyl group, which may be interrupted one or more times by —O— and/or substituted one or more times by —OH, $R^8$ is hydrogen, or a $C_1$-$C_4$alkyl group, $R^9$ is hydrogen, —$CH_2OH$, —$CH_2SPh$, —$CH_2OPh$, or a group of formula $R^{10}$—[$CH_2OH$—O—$CH_2$]$_{n1}$—, n1 is an integer of 1 to 5, $X^2$ is O, or NH, $R^{10}$ is a group of formula —$CH_2$—$X^3$—$CH_2$—C(=O)—$CR^{11}$=$CH_2$, $X^3$ is O, or NH, and $R^{11}$ is hydrogen, or a $C_1$-$C_4$alkyl group.

2. The surface functionalized titanium dioxide nanoparticles according to claim 1, which have a size from 1 nm to 40 nm.

3. The surface functionalized titanium dioxide nanoparticles according to claim 1, wherein a weight ratio of titanium dioxide nanoparticles to phosphonate(s) of formula (I) and alkoxide(s) of formula (II) and (III) is in the range of from 99-1 to 50-50.

4. The surface functionalized titanium dioxide nanoparticles according to claim 3, wherein the weight ratio of phosphonate(s) of formula (I) and alkoxide(s) of formula (II) and (III) varies from 1-99 to 50-50.

5. The surface functionalized titanium dioxide nanoparticles according to claim 1, which exhibit a refractive index of greater than 1.70, when coated on a glass plate and dried at 60° C.

6. The surface functionalized titanium dioxide nanoparticles according to claim 1, wherein in the phosphonate of formula (I):

$R^1$ and $R^2$ are hydrogen, $R^3$ is a group $CH_2$=CH—, or a group of formula —[$CH_2$]$_n$—$R^4$, wherein n is an integer of 1 to 5, and $R^4$ is hydrogen, or a group of formula

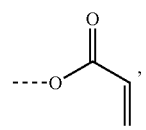

(A-1)

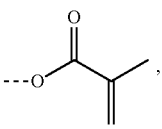

(A-2)

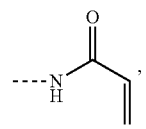

(A-3)

(A-4) 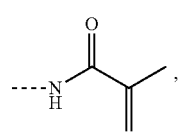
(A-5) 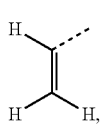
(A-6) 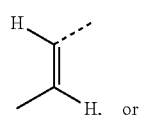 or
(A-7) 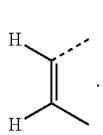
7. The surface functionalized titanium dioxide nanoparticles according to claim 1, wherein the alkoxide of formula (III) is derived from at least one of the following alcohols:
(C-1) 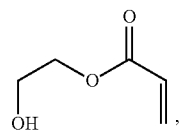
(C-2) 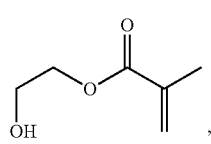
(C-3) 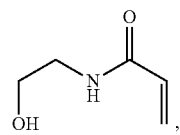
(C-4) 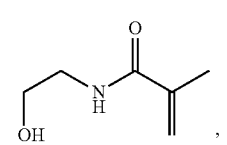
(C-5) 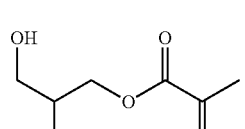
(C-6) 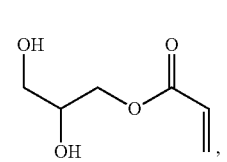
(C-7) 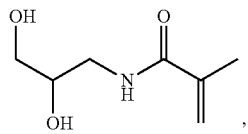
(C-8) 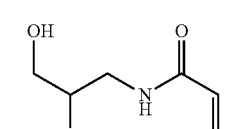
(C-9) 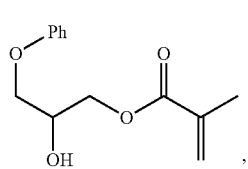
(C-10) 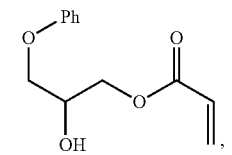
(C-11) 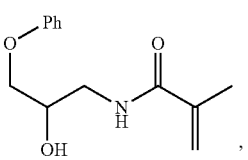
(C-12) 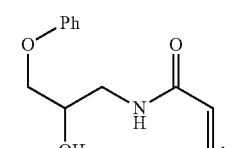
(C-13) 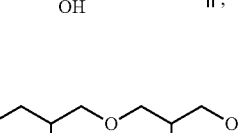
(C-14) 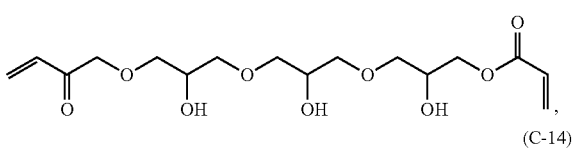
(C-15) 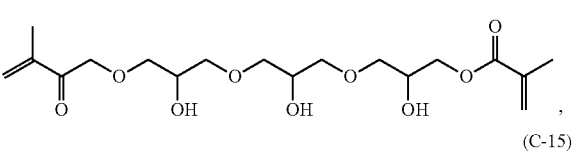
(C-16) 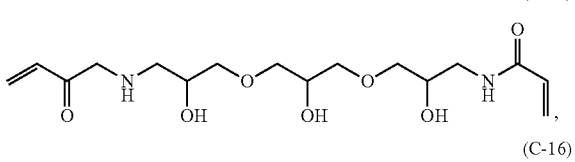

(C-17)

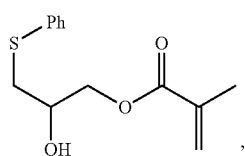

, (C-18)

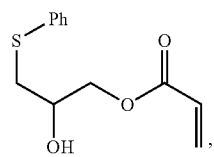

, (C-19)

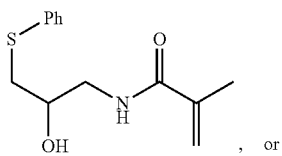

, or (C-20)

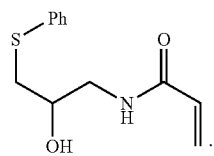

.

8. The surface functionalized titanium dioxide nanoparticles according to claim 1, which is:

a) treated with a phosphonate of formula (B2'a)

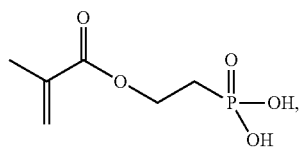

and b) bonded with an alkoxide of formula EtO⁻ (D-2), iPropO⁻(D-4) and (C-10')

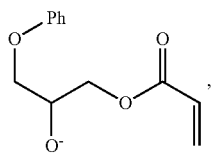

, or a) treated with a phosphonate of formula (B1a)

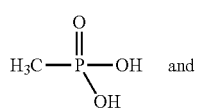 and (B2'a)

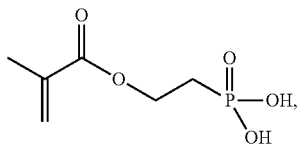

and b) bonded with an alkoxide of formula EtO⁻ (D-2) and iPropO⁻(D-4).

9. A coating composition, comprising the surface functionalized titanium dioxide nanoparticles according to claim 1 and a solvent.

10. A method for forming a surface relief microstructure on a substrate, the method comprising:
   a) forming a surface relief microstructure on a discrete portion of the substrate; and
   b) depositing the coating composition according to claim 9, on at least a portion of the surface relief microstructure.

11. The method according to claim 10, wherein step a) comprises:
   a1) applying a curable compound to at least a portion of the substrate;
   a2) contacting at least a portion of the curable compound with surface relief microstructure forming means; and
   a3) curing the curable compound.

12. A process, comprising coating an article with the coating composition according to claim 9, where the article is selected from the group consisting of a hologram, a wave guide and a solar panel.

13. A security, or decorative element, comprising a substrate, which may contain indicia or other visible features in or on its surface, and on at least part of the said substrate surface, a coating, comprising the surface functionalized titanium dioxide nanoparticles according to claim 1.

14. A process for preparing titanium dioxide nanoparticles, the process comprising:
   (a) adding a solution of concentrated hydrogen chloride and diluting the solution with half volume of distilled water, diluting the solution with additional ethanol resulting in solution I to a solution of titanium-tetra-iso-propoxide first stirred in absolute ethanol resulting in a solution II, both volumes of the solutions I and II being equal, to obtain a clear solution,
   (b) stirring the obtained clear solution for 5 days at room temperature, and
   (c) evaporating the clear solution at 20-30° C./20 mm until a constant weight is achieved to obtain titanium dioxide nanoparticles.

15. The process according to claim 14, comprising:
   d) dissolving the titanium dioxide nanoparticles obtained in step c) in a solvent,
   e) adding a phosphonate(s) of formula (I)

(I)

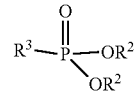

and, optionally adding an alcohol of formula

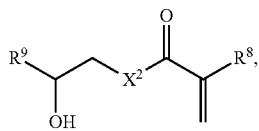

(III')

obtaining a mixture having a weight, and
stirring the mixture obtained in step (e) until a transparent solution is obtained, and evaporating the mixture until the weight remains constant, wherein:
$R^8$ is hydrogen, or a $C_1$-$C_4$ alkyl group,
$R^9$ is hydrogen, —$CH_2OH$, —$CH_2SPh$, —$CH_2OPh$, or a group of formula $R^{10}$—$[CH_2OH—O—CH_2]_{n1}$—,
n1 is an integer of 1 to 5,
$X^2$ is O, or NH,
$R^{10}$ is a group of formula —$CH_2$—$X^3$—$CH_2$—$C(=O)$—$CR^{11}=CH_2$,
$X^3$ is O, or NH, and
$R^{11}$ is hydrogen, or a $C_1$-$C_4$ alkyl group.

16. Titanium dioxide nanoparticles obtained by the process according to claim 14, which have a particle size from 1 nm to 40 nm and a $TiO_2$-content of at least 40% by weight, a film of which dried at 25° C. shows a refractive index of greater than 1.70 (589 nm).

17. The titanium dioxide nanoparticles according to claim 16, which are storable at 4° C. for at least 3 months and can be redissolved in methanol, ethanol, propanol, 2-methoxy ethanol, iso-propanol, 2-iso-propoxy ethanol, butanol, ethyl acetate, propyl acetate and butyl acetate.

* * * * *